United States Patent Office 2,802,799
Patented Aug. 13, 1957

2,802,799

FREEZE RESISTANT AQUEOUS POLYMER CONTAINING PAINT

Paul H. Johnson, Akron, Ohio, assignor to The Firestone Tire & Rubber Company, Akron, Ohio, a corporation of Ohio No Drawing. Application March 28, 1956,
Serial No. 574,395

7 Claims. (Cl. 260—29.7)

This invention relates to water paints and more particularly to water paints containing an aqueous polymer dispersion.

Desirable water paints have recently been proposed having paint pigments dispersed in a synthetic polymer latex. By "latex" and "dispersion" is meant an aqueous colloidal suspension or emulsion, the dispersed particles of which possess an average diameter in the range of about ten milli-microns to one micron.

Synthetic polymer latices, suitable for paints of the above type, include those produced by aqueous polymerization of a polymerizable ethylenic compound either with itself or with one or more different polymerizable ethylenic compounds. Polymerizable ethylenic compounds include the conjugated dienes and the monoethylenically unsaturated compounds such as the vinyl aromatic compounds, the alpha-methylene carboxylic acids and esters, nitriles, aldehydes, ketones, and amides thereof, the vinyl aliphatic compounds, the vinylidene compounds, the methylene hydrocarbons and the like. Suitable dienes are butadiene-1,3, isoprene, 2,3-dimethyl butadiene-1,3, piperylene, 2-chlorobutadiene-1,3, 2,3-dichlorobutadiene-1,3, 2-bromobutadiene-1,3, 2-fluorobutadiene-1,3, 2,3-difluorobutadiene-1,3 and the like. Suitable vinyl aromatic compounds are styrene, vinyl toluene, divinyl benzene, the nuclearly substituted styrenes such as the chlorostyrenes and alkyl styrenes, alpha-chlorostyrene, alpha-methylstyrene, vinyl naphthalene, vinyl pyridine, vinyl carbazole and the like. Examples of various of the alpha methylene compounds are acrylic acid, acrylamide, methyl acrylate, methyl methacrylate, methacrylic acid, methacrylamide, acrolein, acrylonitrile, methacrylonitrile and the like. Vinyl aliphatic compounds include vinyl chloride, vinyl bromide, vinyl fluoride, vinyl acetate, vinyl propionate, vinyl formate, vinyl methyl ether, vinyl ethyl ether, divinyl methyl ketone, vinyl ethyl ketone, vinyl isobutyl ketone, divinyl ketone, vinyl ethyl sulfone, the vinyl thioethers, and the like. Suitable vinylidene compounds are vinylidene fluoride, 1-chloro-1-fluoro-ethene, vinylidene cyanide, and the like. Representative of the alpha-methylene hydrocarbons are isobutene, ethylene and propylene. Polymerizable halo-ethylenes, such as chloro-trifluoroethylene, are also suitable monomers. Although homopolymers, either rubbery or resinous, are suitable, many of the more desirable synthetic polymers for water paints are copolymers of a minor proportion of a conjugated diene and a major proportion of a monoethylenically unsaturated compound. "Copolymer" is meant to include terpolymers and other interpolymers.

The polymer latices can be mixed with most of the common paint pigments to produce a paint or coating composition of the water dispersion type, which dries to form an opaque film. The pigments can be added as dry powders to the latex if sufficient precautions, known to the art of compounding natural rubber latex, are taken to avoid coagulating the latex. However, it is preferred to form a water dispersion of the pigments first and then to mix this dispersion carefully with the latex.

Most paint pigments are hydrophobic and require the presence of a dispersing agent for the production of a water dispersion of the pigments suitable for mixing with the latex. Many of the dispersing agents known to the colloid art can be utilized, including the various water soluble soaps, the aliphatic or aromatic sulfonates, the sulfolignins, the aliphatic sulfates, and other anionic emulsifying agents on the market; various polyethers, ether-alcohol condensates and other nonionic emulsifying agents; and the various hydrophilic colloidal dispersing agents, including casein, soya bean protein and other animal and vegetable proteins (including albumens) capable of reacting with an alkaline material to become dispersible in water, cellulose ethers, such as methyl cellulose, and other water dispersible cellulose derivatives, as well as other hydrophilic colloids well known in the colloid art. Two or more dispersing agents may advantageously be used in a single paint.

Typical paint pigments which are successfully incorporated with the polymer latex into a paint include titanium dioxide (the anatase or rutile grade is satisfactory), clay, silica, lithopone, mica, barium sulfate, talc and zinc sulfide. Many dyes and colored pigments may be included in the pigment formulation, including carbon black, iron oxides, cadmium yellows, phthalocyanines, ultramarine, chromium oxides, umber and sienna.

An example of a satisfactory paint of the flat interior type is a white paint utilizing casein as the pigment dispersing agent. It is well known in the paint industry that casein can be readily made dispersible in water by treating it with a water solution of an alkaline material, including ammonium, sodium or potassium hydroxide or an alkaline salt such as borax, sodium or potassium carbonate. For example, 10 parts of dry casein are added to 56 parts, by weight, of soft water, and the mixture is allowed to stand at ordinary room temperature for 30 to 60 minutes. Then the mixture is stirred and warmed to about 60° C. One part of borax is added to the warm mixture with stirring, and the mixture is stirred for an additional 30 minutes at 60° C. The casein dispersion is allowed to cool. Preferably a fungicide is added to the casein dispersion to protect it and the resulting paint from mold, etc.; e. g., 2 to 3 parts of a 20% solution of Dowicide A[1] (and a corresponding reduction of the original water, employed for dispersing the casein, from 56 to 53 or 54 parts) is added to the cool casein dispersion.

A paint of the invention can be prepared in accordance with the following formula:

| Ingredients: | Parts by weight |
|---|---|
| Pigment(s) | 20 to 40 |
| Water | 14 to 30 |
| Casein dispersion | 1 to 10 |
| Antifoaming agent | 0.75 to 3 |
| Polymer latex | 20 to 55 |

A somewhat more detailed formula is:

| Ingredients: | Parts by weight |
|---|---|
| Titanium dioxide | 2 to 25 |
| Lithopone | 3 to 12 |
| Silica and silicates | 4 to 12 |
| Color (if desired) | 3 to 12 |
| Water | 14 to 30 |
| Protein—dry (as a dispersion) | 1 to 3 |
| Antifoaming agent | 0.75 to 3 |
| Polymerized oil | 1 to 6 |
| Polymer latex | 25 to 55 |

[1] Sodium salt of ortho-phenyl phenol.

The ingredients are chosen in the ranges shown in the above formulas, depending upon the specific paint properties desired. The paint is prepared by mixing the ingredients in a can by means of a conventional paddle stirrer. The water preferably containing about one percent of $NaP_2O_7$ or other soluble phosphate as a pigment dispersant, is stirred while the pigments or mixture of pigments is added. The mixture is stirred for several minutes to insure thorough wetting of the pigment. Then the casein dispersion is added and the mixture is stirred until uniform in appearance. An antifoaming agent, such as pine oil, tributyl phosphate or similar oily antifoamer is then added. Additional fungicide, amounting to 1 to 2 parts, can be added at this point to improve the resistance of the paint to fungi attack. Then the polymer latex is carefully added, with slow stirring, so as to avoid formation of foam, and the paint is slowly stirred for an additional period of 15 to 30 minutes. The mixed paint is then filtered, if desired, and is ready for use or packaging.

Polymer-containing water paints, of the general type above referred to, tend to thicken and often to coagulate when subjected to low temperatures such as those which prevail in many geographical localities during winter. This is particularly true if the temperature is ever sufficiently low to cause the paint to freeze. Paints which have coagulated are solid and are no longer suitable as paints. Ease of application of a paint influences greatly the customer-acceptance of the paint. For this reason, present paint manufacturers strive to produce paints which require no adjustment by the customer prior to application, that require no thinning or thickening before use, and that have uniform predictable properties such as covering power and the like.

Viscosity of a paint is adjusted by the manufacturer to a value which is optimum for ultimate use. If, subsequent to packaging, the viscosity of the paint increases radically from this optimum value, many difficulties attend the use of the paint. First of all, the paint must be thinned to permit satisfactory brushing, spraying or other application of the paint to a surface to be painted. Since the solids-liquid ratio of the paint has been designed to give optimum covering power, optimum hiding power, and uniformity of other properties, thinning of these finished paints can so fundamentally change the paint as to result in inferior covering and non-uniformity of other desirable properties. In this regard it should be borne in mind that paints of this type are often used by unskilled painters who often overthin the paint with undesirable results. Paints, which thicken excessively after freezing or thawing, or which coagulate on freezing, therefore, require special precautionary handling to prevent their freezing. This requirement for special precautionary handling of these paints is costly, cumbersome and detracts greatly from the universal acceptance of such paints.

Proposals have recently been advanced to render certain of the water paints of the types discussed above essentially freeze resistant. As used herein, "freeze resistance" or "freeze stability" of a paint refers to the relative ability of the paint to withstand freezing and thawing without coagulation or excessive thickening. Many of these proposals have been concerned with special techniques of polymerization. For example, freeze stability of a water paint containing a polymer dispersion is greatly improved if the polymer dispersion is produced by a method which results in a relatively large particle size latex. Large particle size synthetic latices can be prepared by several means, one of which contemplates polymerization of monomer in an aqueous medium in the presence of relatively large proportions of a soluble salt of persulfuric acid as a catalyst (e. g. about 1% or more catalyst on the weight of monomer) and the absence, or presence of only a very small amount, of an initial emulsifying agent.

Freeze stability of water paints has also been considerably enhanced by special additional stabilization of the polymer dispersion at some point or points subsequent to the initial stages of polymerization, for example, by addition of surface active stabilizers to the polymer latex, to the pigment dispersion or to the finished paint. Suitable additional stabilizers of this type include anionic stabilizers, nonionic stabilizers or often more desirably a mixture of one or more stabilizers of each type.

While the above proposed improvements of freeze stability of polymer-containing water paints have contributed much to the problem involved, nevertheless they have not entirely alleviated the difficulties. One factor, which detracts somewhat from the effectiveness of any of these proposals in commercial production, is the sensitivity of the latex and paint systems to slight variations of production conditions or quality of ingredients used. Desirable results are, therefore, reproduced with great difficulty. For example, commercially available materials of the same grade often vary sufficiently in quality, even though originating from the same supplier, to cause freeze-instability of an otherwise freeze-stable water paint. Similarly, variations in the conditions of polymerization, which are so slight as not readily to admit of practical control in a commercial operation, adversely affect the freeze stability of the polymer-containing paint.

An object therefore is to provide a polymer-containing water dispersion paint which will not coagulate or thicken excessively when subjected to freezing and subsequent thawing conditions. Another object is to provide a method for producing polymer-containing water paints which neither coagulate nor thicken excessively when subjected to freezing and thawing conditions, despite slight variations of conditions of preparation or quality of ingredients. Another object is to provide a polymer-containing water paint which is freeze stable. Still another object is to provide a method of improving the freeze stability of existing polymer-containing water paints.

The above and further objects are obtained in accordance with the invention by incorporating in a polymer-containing water paint a polyalkylene polyamine. Illustrative of such polyamines are diethylene triamine, triethylene tetramine, tetraethylene pentamine, pentaethylene hexamine, nonaethylene decamine, higher polyethylene polyamines and other polyalkylene amines such as dipropylene triamine, tripropylene tetramine and the like. In practicing the invention the polyamines are introduced into the polymer latex after polymerization and before addition of paint pigment, or the polyamines are introduced into an otherwise finished polymer-containing water paint. The polymer latices used in the production of the improved paints of invention are those produced by aqueous emulsion copolymerization of a minor proportion of conjugated diene with a major proportion of a polymerizable monoethylenically unsaturated compound, in the presence of at least 1.0 part by weight of a soluble salt of persulfuric acid and up to about 2.5 parts by weight of initial emulsifier, both per 100 parts by weight of monomers. The polymer latices used in the practice of the invention, preferably, contain additional surface active stabilizing emulsifying agent added after about 50% polymerization conversion.

In the examples, freeze stabilities of the polymer-containing water paints were determined according to the following procedure. A weighed portion of the paint being tested was placed in a ½ pint metal can. The viscosity of the paint was adjusted to a desired value in seconds as measured in a conical brass cup, capacity 90 ml., with a bottom orifice 0.277 inch in diameter, by addition of either water as a diluent or sodium polyacrylate as a thickener. Viscosity according to this test was determined by filling the cup with paint and measuring the time in seconds for the paint to flow through the cup orifice until the stream of paint broke (viscosity determinations were made at 23 to 25° C.). The metal can containing the paint was then placed in a freezing chamber where it was maintained at −25° C. for 16 hours. The can was then removed from the freezing chamber and the solidly frozen contents were allowed to thaw at room temperature. When the contents of the can had reached room temperature, the contents of the can were observed to see if coagulation of the polymer had occurred. If the paint was not coagulated, it was stirred and its viscosity determined (in the manner outlined above). A paint which does not coagulate after freezing and thawing is considered to have some degree of freeze stability. The relative freeze stability of such paint can be characterized by the viscosity of the thawed paint. When the freeze characteristics of the paint had been observed after one freezing and thawing cycle, the can was again covered and subjected to succeeding identical freezing and thawing cycles until the contents coagulated, or exhibited poor stability, or became too viscous to permit viscosity determination by the above method, or had been subjected to four freezing and thawing cycles. Relative freeze stability of a paint sometimes becomes more quickly apparent by noting the change (increase) in viscosity brought about by freezing and thawing. For convenience this change is reported hereafter as $\Delta\mu$, which is obtained by subtracting the original viscosity (before freezing) in seconds from the viscosity in seconds after a particular freezing cycle. Unless indicated otherwise $\Delta\mu$ hereafter refers to the fourth freezing cycle.

A fuller understanding of the invention may be had by reference to the examples, which are intended to illustrate but not to limit the invention.

*Example 1*

The following ingredients in the amounts indicated were charged into a polymerization reactor.

| | Parts by weight |
|---|---|
| Butadiene | 37.0 |
| Styrene | 63.0 |
| $K_2S_2O_8$ | 1.3 |
| MP-189-S [1] | 0.4 |
| $Na_2B_4O_7.10H_2O$ | 1.6 |
| Water | 135.0 |

[1] An alkyl sodium sulfonate supplied by E. I. du Pont de Nemours & Company.

The reactants were agitated and maintained at a temperature of 70° C. to effect polymerization. At about 60% polymerization conversion 2.2 parts by weight of Nacconol NRSF [2] was injected into the reaction mixture and polymerization was then carried to completion. The resulting latex was then further stabilized by addition thereto of 3.0 parts by weight of Triton X–100 [3] and 2.0 parts by weight of ammonium linseed oil fatty acid, both per 100 parts of polymer.

An aqueous paint pigment dispersion was prepared in accordance with the detailed description above. Two samples of paint were then prepared by, in each instance, mixing together in a ½ pint tin can 174 grams of the aqueous pigment dispersion with a portion of the above polymer latex containing 34 grams of polymer. One of the two paint samples (hereafter referred to as sample A) was then treated in accordance with the invention by adding thereto 0.51 gram diethylene triamine (1.5% amine on the weight of polymer). The other paint sample (hereafter referred to as sample B) was maintained as a control. The viscosity of each of these two paint samples was adjusted, by addition of sodium poly-acrylate, to a value of 9.4 seconds. The cans were then covered and subjected to the freeze test outlined in detail above. Neither of the paint samples coagulated.

[2] An alkaryl sulfonate supplied by National Aniline Division of the Allied Chemical and Dye Corporation.
[3] A polyether alcohol type non-ionic emulsifier supplied by Resinous Products and Chemical Company.

The viscosity determinations obtained are reported in seconds as follows:

| | Before Freeze | 1st Freeze | 2nd Freeze | 3rd Freeze | 4th Freeze | $\Delta\mu$ |
|---|---|---|---|---|---|---|
| Sample A | 9.4 | 14.9 | 17.0 | 18.0 | 17.4 | 8 |
| Sample B | 9.4 | 22.8 | 26.6 | 27.2 | 37.5 | 28.1 |

It is seen, by reference to the above data, that the viscosity of sample A in accordance with the invention increased only 8 seconds after the four severe freezing cycles of the test. The viscosity of sample B, not in accordance with the invention, increased under the same conditions some three and one-half times as much as the viscosity of sample A. The paint of sample A, in accordance with the invention, was suitable for application as a paint without further treatment after the four severe freezing cycles. The paint of sample B, on the other hand, was too viscous for application after the four freezing cycles and required thinning for use. It should be noted at this point that larger amounts of the surface active stabilizers such as the anionics or non-ionics do not additionally improve the freeze stability of paints such as the paint of sample B.

*Example 2*

Another polymer latex was prepared and stabilized utilizing the same procedure, the same ingredients and proportions thereof as used in preparing the latex of Example 1. Paint samples were prepared by, in each instance, mixing in a ½ pint metal can a portion of the stabilized polymer latex containing 34 grams polymer with 174 grams of the same aqueous pigment dispersion used in preparing the paint samples of Example 1. One sample (sample C) was maintained as a control. The remaining samples were treated in accordance with the invention by adding thereto the following amounts of the following polyamines.

| Paint Samples | Additive | Grams of Additive | Percent Additive by Weight on polymer |
|---|---|---|---|
| C | | | |
| D | diethylene triamine | 0.51 | 1.5 |
| E | do | 0.34 | 1.0 |
| F | triethylene tetramine | 0.34 | 1.0 |
| G | tetraethylene pentamine | 0.34 | 1.0 |

The viscosities of the above paint samples were adjusted to the values shown under the designation "Before freeze" below. All of the paint samples were then subjected to the previously described freeze test. The results of the tests were as follows:

VISCOSITIES IN SECONDS

| Paint Sample | Before Freeze | 1st Freeze | 2nd Freeze | 3rd Freeze | 4th Freeze | $\Delta\mu$ |
|---|---|---|---|---|---|---|
| C | 9.8 | 31.6 | >40 | [1] TVTM | | [2] >30 |
| D | 9.7 | 14.4 | 14.2 | 15.4 | 16.0 | 6.3 |
| E | 9.7 | 14.0 | 16.0 | 18.8 | 21.0 | 11.3 |
| F | 9.7 | 15.2 | 19.0 | 28.2 | 33.6 | 23.9 |
| G | 9.4 | 17.2 | 24.6 | >40 | [1] TVTM | [2] 15.2 |

[1] TVTM is used herein where the paint is too viscous to measure under the previously described procedure of measurement.
[2] $\Delta\mu$ in this instance is reported for the 2nd freeze.

Referring to the above data, it is seen that after the first freezing cycle the paint of sample C (not in accordance with the invention) was too viscous for use without thinning; its viscosity had increased by some 20 seconds. After the third freezing cycle the viscosity of the paint of sample C was so great that it could no longer be measured according to the procedure used.

All of the paints containing polyethylene polyamines in accordance with the invention are seen to be considerably superior in freeze resistance to the paint of sample C. The paints of samples D, E and F required no adjustment of viscosity even after four complete freezing cycles. While the paint of sample G was not as freeze resistant as some of the other paints containing polyamines, it was considerably more freeze resistant than sample C in that its viscosity increase was only one half that of sample C after the second freeze cycle and it survived an additional severe freezing and thawing cycle before requiring viscosity adjustment for ultimate use. It will be seen in subsequent illustrations of the invention that larger amounts of the amines further improve the freeze stability of a paint.

*Example 3*

Still another polymer latex was prepared and stabilized according to the same procedure and using the same ingredients and proportions as the previously described latices. Paint samples were prepared by, in each instances, mixing a portion of this latex containing 32.8 grams polymer with 180.5 grams of the same paint pigment dispersion used to prepare the paints of the preceding examples. One sample (sample H) was maintained as a control. The remaining samples were treated in accordance with the invention by adding thereto the following amounts of the following polyamines.

| Paint Sample | Additive | Grams of Additive | Percent Additive by Weight on Polymer |
|---|---|---|---|
| H | | | |
| I | diethylene triamine | 1.23 | 3.8 |
| J | do | 2.45 | 7.5 |
| K | do | 4.90 | 15.0 |
| L | triethylene tetramine | 1.74 | 5.3 |
| M | do | 3.48 | 10.6 |
| N | do | 6.95 | 21.2 |
| O | tetraethylene pentamine | 2.25 | 6.9 |
| P | do | 4.49 | 13.7 |
| Q | do | 8.98 | 27.4 |

The viscosities of these paints were adjusted to the values shown below under the designation "Before freeze." All of the paints were subjected to the previously described freeze tests. The results follow:

VISCOSITIES IN SECONDS

| Paint Sample | Before Freeze | 1st Freeze | 2nd Freeze | 3rd Freeze | 4th Freeze | Δμ |
|---|---|---|---|---|---|---|
| H | 9.4 | 30 | TVTM | | | [1] >20 |
| I | 6.4 | 7.6 | 8.0 | 8.3 | 8.8 | 2.4 |
| J | 6.4 | 7.3 | 7.3 | 7.3 | 7.5 | 1.1 |
| K | 5.9 | 6.5 | 6.1 | 6.1 | 6.6 | 0.7 |
| L | 6.6 | 7.0 | 7.3 | 7.9 | 8.5 | 1.9 |
| M | 6.0 | 6.3 | 6.4 | 6.9 | 7.1 | 1.1 |
| N | 5.7 | 6.1 | 5.9 | 5.9 | 6.6 | 0.9 |
| O | 6.3 | 6.6 | 6.9 | 7.3 | 7.8 | 1.5 |
| P | 5.8 | 6.6 | 6.5 | 6.7 | 7.1 | 1.3 |
| Q | 5.5 | 6.4 | 6.9 | 6.1 | 6.4 | 0.9 |

[1] Δμ in this instance is reported for the 1st freeze cycle.

The paint of sample H, not in accordance with the invention required thinning even after one freeze cycle before it could be used as a paint. The results reported in Example 3 show that it is possible, by use of relatively larger amounts of the polyalkylene polyamines, to produce paints which exhibit essentially no viscosity change despite successive rigorous exposure to freezing and thawing cycles. It should be noted, however, that improvement in freeze stability is relatively slight above three to five percent polyamine on the polymer. For this reason as well as for economic considerations, relatively small amounts of the polyamines will ordinarily be used. Less than 0.5% polyamine on the polymer are used with demonstrable improvement of the freeze stability of a polymer-containing paint. Since variations of polymer-containing paints both in constitution and method of making will vary somewhat the optimum quantities of polyalkylene polyamines and these optimum quantities of polyalkylene polyamines may be readily determined by those skilled in the art, it should be understood that the invention is not limited to a precise proportion of these amines. The preceding examples are merely illustrative of the invention and practice thereof and it should be remembered that many variations can be made without departing from the spirit and the scope of the invention. This application is a continuation-in-part of my application Serial No. 337,640, filed February 18, 1953, now abandoned.

What is claimed is:

1. An improved freeze-stable water dispersion paint consisting essentially of a synthetic polymer latex, a polyalkylene polyamine and water-dispersed paint pigment, said latex being produced by aqueous emulsion copolymerization of a minor proportion of conjugated diene with a major proportion of polymerizable monoethylenically unsaturated compound, in the presence of at least about 1.0 part by weight of a soluble salt of persulfuric acid and up to about 0.4 part by weight, of initial emulsifier, both per 100 parts by weight of monomers; and said paint containing additional surface active stabilizing emulsifying agent added after 50% polymerization conversion.

2. An improved freeze-stable water dispersion paint consisting essentially of a synthetic polymer latex, a polyalkylene polyamine and water-dispersed paint pigment, said latex being produced by aqueous emulsion copolymerization of a minor proportion of conjugated diene with a major proportion of polymerizable monoethylenically unsaturated compound, in the presence of at least about 1.0 part by weight of a soluble salt of persulfuric acid and up to about 2.5 parts by weight, of initial emulsifier, both per 100 parts by weight of monomers; and said paint containing additional surface active stabilizing emulsifying agent added after 50% polymerization conversion.

3. A paint in accordance with claim 2 wherein the polyalkylene polyamine is diethylene triamine.

4. A paint in accordance with claim 2 wherein the polyalkylene polyamine is triethylene tetramine.

5. A paint in accordance with claim 2 wherein the polyalkylene polyamine is tetraethylene pentamine.

6. A paint in accordance with claim 2 wherein the polyalkylene polyamine is pentaethylene hexamine.

7. A paint in accordance with claim 2 wherein the polyalkylene polyamine is nonaethylene decamine.

No references cited.

U. S. DEPARTMENT OF COMMERCE
PATENT OFFICE

CERTIFICATE OF CORRECTION

Patent No. 2,802,799     Paul H. Johnson     August 13, 1957

It is hereby certified that error appears in the printed specification of the above numbered patent requiring correction and that the said Letters Patent should read as corrected below.

Column 3, line 6, for "$NaP_2O_7$" read --$Na_4P_2O_7$--; column 7, lines 20 and 21, for "instances" read --instance--.

Signed and sealed this 1st day of July 1958.

(SEAL)
Attest:
KARL H. AXLINE
Attesting Officer

ROBERT C. WATSON
Commissioner of Patents